United States Patent [19]

Hölter

[11] Patent Number: 4,541,361

[45] Date of Patent: Sep. 17, 1985

[54] METHOD AND APPARATUS FOR AUTOMATICALLY FEEDING GREAT NUMBERS OF ANIMALS, ESPECIALLY PIGS

[75] Inventor: Walter Hölter, Ollener Moor, Fed. Rep. of Germany

[73] Assignee: Lohmann Apparatebau GmbH, Cuxhaven, Fed. Rep. of Germany

[21] Appl. No.: 595,600

[22] Filed: Apr. 2, 1984

[30] Foreign Application Priority Data

May 9, 1983 [DE] Fed. Rep. of Germany ....... 3316916

[51] Int. Cl.$^4$ .............................................. A01K 5/02
[52] U.S. Cl. ............................. 119/51 R; 119/52 AF
[58] Field of Search ............... 119/51 R, 52 AF, 56 R

[56] References Cited

U.S. PATENT DOCUMENTS

| | | | |
|---|---|---|---|
| 3,234,910 | 2/1966 | Moloney | 119/56 R X |
| 3,901,193 | 8/1975 | Gehlbach | 119/52 AF |
| 4,141,321 | 2/1979 | Wolf | 119/51 R |

FOREIGN PATENT DOCUMENTS 3123904 12/1982 Fed. Rep. of Germany .... 119/51 R

*Primary Examiner*—Robert P. Swiatek
*Attorney, Agent, or Firm*—Kinney & Lange

[57] ABSTRACT

A method of automatically feeding animals, especially pigs, in which a predetermined stream of a pumpable feed pulp is conveyed through a pipeline from a preparation zone to a feeding zone remote therefrom, the cross sectional area of the pipeline being dimensioned corresponding to the conveying output required in view of the consistency of the feed pulp and the feed requirement to be met with the feeding zone occupied by grown up animals, wherein the feeding times and amounts of feed are preferably predetermined automatically and for feeding with the feed requirement strongly reduced, especially when feeding young animals, a feed pulp strand of limited length is conveyed through the pipeline to at least one dispensing station in the feeding zone by means of a nourishing-physiologically unobjectionable filling liquid introduced into the pipeline, and the length of the strand is dimensioned such that the strand is fed within a period of time sufficiently short to keep it fresh.

12 Claims, 1 Drawing Figure

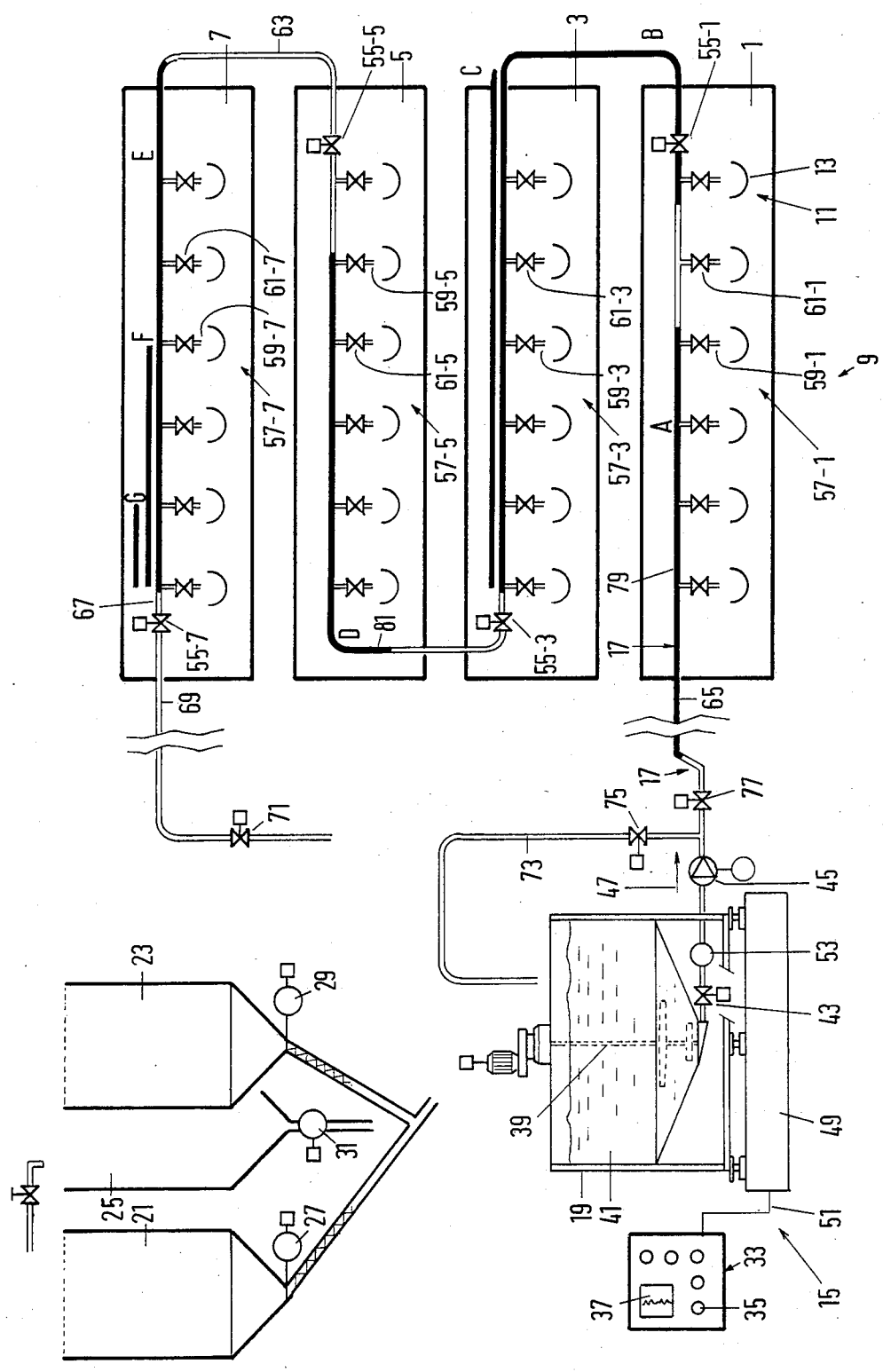

METHOD AND APPARATUS FOR AUTOMATICALLY FEEDING GREAT NUMBERS OF ANIMALS, ESPECIALLY PIGS

The invention relates to a method of automatically feeding great numbers of animals, especially pigs, in which a predetermined stream of feed pulp capable of being pumped is conveyed through a pipeline from a preparation zone to a feeding zone remote therefrom, the cross-sectional area of the pipeline being dimensioned according to the power demand for the conveying in view of the consistency of the feed pulp and the requirement of food to be met when the feeding zone is occupied by grown up animals, with the feeding times and amounts of feed preferably being predetermined automatically.

Methods of the type indicated are being widely used, especially in connection with the feeding of pigs, because it is possible with very little expenditure in terms of apparatuses to largely automatically feed also great numbers of animals and, thus, human labour is still necessary only for the control of the plant and for the observation of the animals. As the feed pulp is highly viscous, it is necessary so as to be able to do still with acceptable driving powers for the conveyor device, to select pipelines having a relatively wide inside crosssectional area, such as pipelines, for example, having an inner diameter of 60 to 100 mm. What is also important in this connection is that the amount of feed to be supplied during one feeding action must be conveyed into the feeding zone as quickly as possible, so as to avoid unrest and stress (and casualties connected therewith) among the animals. For the above reasons there results necessarily a substantial volume and thus a substantial filling amount of feed pulp in the pipeline. Thus, with large numbers of animals, for example, there may easily be 100 m length of pipeline and above, so that pipeline volumes of from 300 to 1000 liters may easily be arrived at. With the feeding zone completely occupied by grown up animals, because of the high feed requirement then to be met, the dwelling time of the feed pulp in the pipeline yet remains relatively short.

Difficulties will arise, however, when one intends to feed considerably smaller amounts of feed using a given plant. This, in particular, is the case if instead of grown up animals young animals are to be fed who not only need less feed per animal but frequently are also kept in smaller numbers to occupy the plant than is the case with grown up animals. The dwelling time of the feed pulp in the pipeline may then easily become so long that the feed pulp present in the pipeline decomposes and perishes and, then, when being fed may affect the health of the animals and disturb the growth or even cause death among the animals.

The conditions become still more difficult when young animals are kept only in certain sections in the feeding zone, while the other sections are empty. The feed requirement is then particularly strongly reduced.

Finally, difficulties may arise by feeds of different compositions intended to be fed in various sections of the feeding zone. This, in particular, is the case when the various sections are occupied by animals of different ages such as, respectively, young animals and grown up animals.

It has been attempted to avoid the difficulties as described above by installing in feeding plants intended to be suited for strongly changing amounts of feed requirements and/or different compositions of feed a second pipeline having in particular a smaller inside cross-sectional area. The additional expenditure required for this is considerable. The operation, maintenance and cleaning of such plants are substantially more troublesome than with plants having only one single pipeline. The danger of feed perishing through too long dwelling times in the pipeline is not overcome.

It is the object of the present invention to provide a simple method of feeding for large numbers of animals, which is highly automatizable and suited both for strongly fluctuating feed requirements and differing compositions of feed.

This object is attained in accordance with the invention with the aid of a method of the type mentioned at the beginning, which is characterized in that for feeding with the feed requirement reduced and the composition of feed changed, particularly when feeding young animals which may be present perhaps only in selected sections of the feeding zone, a feed pulp strand of limited length is conveyed through the pipeline to at least one dispensing station in the feeding zone by means of a filling liquid being introduced into the pipeline which is unobjectionable from a nourishing physiological viewpoint, and in that the length of the strand is dimensioned to be such that it is fed within a period of time which is sufficiently short to keep it fresh.

With the feeding method according to the invention one and the same pipeline is used for all sizes of feed requirement; however, excessively long dwelling times of feed pulp in the pipeline are avoided even with low feed requirements, because the feed pulp strand is conveyed into the feeding zone at a high velocity and may be completely used up there within a short period of time. As the pipeline same as with the preknown manner of processing remains completely filled with pumpable liquid medium, it is possible on principle to use the same processing technique as with similar pre-known methods. The reduction in the consumption of feed is not obtained via a low throughflow in the pipeline but through filling the pipeline section by section with the feed pulp.

It has been found that with the method according to the invention a mixing of the filling liquid which only serves purposes of transport with the feed pulp strand does not take place in an objectionable extent, not even in connection with relatively long pipelines. As the filling liquid is unobjectionable from a nourishing physiological viewpoint, it may also be discharged into the filling zone or may be returned in a manner known-perse into the circuit of the zone of preparation. Water is preferably used as the filling liquid, because it is available everywhere and will be needed anyway for nourishing the animals.

In the case of larger feeding plants it is usual to dispense the feed pulp within the feeding zone via a series of dispensing stations distributed along the pipeline and fed from the pipeline, said dispensing stations being adapted to be selectively opened towards the pipeline by groups of at least one dispensing station each. When feeding, the feed pulp strand being used must then move through considerable distances via bends and flow past valves. So as to disturb as little as possible the coherence of the feed pulp strand during this movement, the process is then carried out in one embodiment of the invention in such a manner that selected groups of dispensing stations are supplied one after the other with selected amounts of feed pulp from one and the same feed pulp strand, with the respective other groups being cut off from the pipeline. According to this embodiment, thus, the groups of dispensing stations are interconnected with each other in series with respect to the feed pulp strand, so that the feed pulp strand need not split into branches.

With the process according to the invention a very far reaching automatization of the feeding operation is easily possible, because the respective whereabouts of the feed pulp strand may be very exactly determined from the material charged into the pipeline flowing therethrough. Accordingly, in further developing the invention the momentary position of the feed pulp strand in the pipeline is determined from the volumes of feed pulp and filling liquid charged into the pipeline, and only such dispensing stations of the selected groups are opened towards the pipeline as are disposed within the zone of the whereabouts of the feed pulp strand. In this embodiment, in particular, no sensing means are needed for the whereabouts of the feed pulp strand in the feeding zone.

Also in case the feed pulp strand has to be guided into certain transport channels out of several possible transport channels, the above mentioned detection of the whereabouts of the feed pulp strand is advantageous; it is then possible, namely, to actuate guiding valves for determining the transport channel or transport path of the feed pulp strand in dependence upon the detected whereabouts of the feed pulp strand.

With feeding programs providing for relatively short time intervals between the individual feeding operations it may be to the purpose to charge several feed pulp strands into the pipeline one after another at certain times corresponding to the feeding program charging the filling liquid in between. Operating this way, less feed pulp is charged than would be the case when using one feed pulp strand sufficient for several subsequent feeding operations, and correspondingly shorter will be the dwelling time of the feed pulp in the pipeline.

On principle, the pipeline may be simply closed at its end disposed beyond the feeding zone; the onward movement of the column of feed pulp and filling liquid standing in the pipeline will then be controlled solely according to the consumption, and also a flushing of the pipeline is easily possible via the dispensing station disposed farthest downstream. In many cases, however, it will be desired to discharge the filling liquid and possible surplus proportions of the feed pulp strand from the feeding zone, especially also back to the preparation zone for reuse, for example. In this case it is to the purpose in further developing the invention for the filling liquid and possible surplus proportions of the feed pulp strand to be discharged from the feeding zone via a selectively openable discharge line.

It will easily be recognized that it is possible with the process according to the invention in case of necessity also to charge feed pulp strands of different compositions one after the other into the pipeline and pass them to selected dispensing stations, and that this specific manner of operation is easily programmable and thus may also be brought to run off automatically. Thus, it is possible with the process according to the invention with one single pipeline to transport feed portions of different compositions and in different, even smallest, amounts to the selected dispensing stations.

To carry out the process an apparatus serves, according to the invention, comprising preparation device for preparing a pumpable feed pulp from several components, a pipeline for establishing a communication between the preparation means and a feeding zone comprising at least one group of dispensing stations having controllable discharge valves, a conveying means for conveying pumpable media present in the pipeline, means for determining the flow in the pipeline and control means for preferably automatically controlling the means with the free cross-sectional area of the pipeline being selected corresponding to the viscosity of the feed pulp in such a manner that a flow of feed pulp sufficient for feeding grown up animals may be arranged for with reasonable energy expenditure for the conveying means, and with the pipeline beyond the dispensing stations preferably being connected to an outlet line via a controllable shutoff valve; this apparatus is characterized in accordance with the invention in that means are provided for charging a filling liquid which is unobjectionable from a nourishing physiological viewpoint, preferably water, selectively measured into the pipeline instead of feed pulp, and in that the control means is designed to detect the whereabouts of a feed pulp strand of limited lenngth charged into the pipeline and adapted to be driven forward by the filling liquid, and to control the discharge valves in dependence upon the detected whereabouts of the feed pulp strand.

The apparatus according to the invention as compared to conventional devices of similar types requires but little additional expenditure. Through the preparation of a feed pulp strand of limited length which is capable of being driven onward by a filling liquid, the advantages are obtained which are already described above, especially the important advantage that the dwelling time of the feed in the pipeline may be kept so short even with strongly reduced feed requirements that perishing of feed is precluded. It is technically easily possible, especially by measuring the flow, to provide the control device with data concerning the whereabouts of the feed pulp strand in the pipeline such that the control device may then properly control the discharge valves in such a manner that a discharge valve will be opened wherever the feed pulp strand also is just present. This detection of the whereabouts of the feed pulp strand also provides the prerequisite for the apparatus according to the invention being adapted to be operated practically completely automatically.

In further developing the invention provision is preferably made for the groups of the dispensing stations to be connected to the pipeline in places distributed along the pipeline. With respect to the pipeline the groups of dispensing stations thus are connected in series. This results in the advantage already mentioned above, that the feed pulp strand need not unnecessarily split. Preferably, this principle is still applied also within the groups, that means that the dispensing stations belonging to one and the same group are connected to the pipeline in places distributed along the length of the pipeline; splitting of the feed pulp strand then being unnecessary also within a group.

For the specific mode of operation as mentioned, in which feed pulp strands of different compositions are charged into the pipeline one after the other and are guided to selected dispensing stations, the preparation device is suitably arranged for selective production of different feed pulp compositions.

The invention will now be described in the following in more detail by way of an example of embodiment in connection with the drawing.

The FIGURE shows an apparatus for feeding pigs. There are four pens 1, 3, 5, 7 provided in one feeding zone 9. In each pen six bays 11 are available. Each bay comprises a feeding trough 13. A pipeline 17 extends to the feeding zone 9 from a preparation zone 15 which may be spacially remote from the feeding zone 9. In the preparation zone 15 a preparation device is provided for the preparation of a pumpable feed pulp from several components. This device comprises a mixing tank 19 and supply containers 21, 23, 25 from which the mixing tank 19 may be charged with the feed components via controllable component metering means 27, 29, 31. In the example shown it is assumed that the supply containers 21 and 23 contain comminuted flowable solid feed components and the supply containers 25 contains water. The component metering means in the embodiment shown are controlled by hand from a central control means 33 (operating buttons 35) or by a program 37. The mixing tank 19 comprises a stirring apparatus 39 which is likewise to be switched from the control means 33. It is thus possible to prepare in the mixing tank a feed pulp 41 of a desired composition.

The pipeline 17 is connected to the lower zone of the mixing tank 19 via a controllable valve 43. A conveying means is provided in the pipeline 17 which conveys the feed pulp taken from the mixing tank 19 onward in the pipeline 17 in the direction of the arrow 47. In the embodiment shown the mixing tank 19 is supported on a weighing machine 49 which controls the filling of the mixing tank 19 and may also be used to gravimetrically determine the weight and/or the volume of the amount discharged through the pipeline 17. The weighing machine 48 continuously supplies an amount signal 51 to the control device 33. It is also possible to provide a flow measuring means 53 instead or additionally in order to measure the amount discharged from the mixing tank 19. The conveying means 45 may also be designed as a flow meter.

The pipeline 17 has so large a free cross-sectional area that the amount of feed pulp necessary to feed grown up animals may be conveyed with tolerable expense in terms of pump output. The pipeline 17 extends through the pens 1, 3, 5, 7 in this succession. At the end of each section of the pipeline 17 which is shown as a pen, a group shutoff valve 55-1, 55-3, 55-5, 55-7 is provided. In each pen a group 57-1, 57-3, 57-5, 57-7 of dispensing stations 59-1, 59-3, 59-5, 59-7 is connected to the pipeline 17 via controllable discharge valves 61-1, . . . , 61-7 in mutually spaced arrangement at locations distributed along the length of the pipeline 17. In the embodiment shown each bay 11 has associated thereto a dispensing station. In general, the lengths 63 of the pipeline 17 disposed between the groups (pens) are small as compared to the length of the pipeline section 65 between the feeding zone 9 and the preparation zone 15. This section 65 may have a considerable length, especially in case of larger pens.

In the embodiment shown the pipeline 17 at the downstream end 67 thereof (at the end of the last pen 7) continues by merging into an outlet line 69 via an outlet valve provided there, with the last group shutoff valve 55-7 serving in this case as such an outlet valve, and the outlet line 69 returning as shown to the preparation zone 15; there the outlet line 69 is closed by a controllable shutoff valve 71. In the preparation zone 15 the outlet line may terminate, for example, in a waste water channel, a waste water reconditioning plant or, optionally, also in the water supply 25 or the mixing tank 19.

In many cases the outlet line 69 may be dispensed with, because it will in general be possible to discharge surplus filling liquid into the troughs 13 or into the pens via the dispensing stations.

The apparatus furthermore comprises a circulation line 73 with a controllable shutoff valve 75 as well as another controllable shutoff valve 77 directly downstream of the branching to the circulation line 73. With the apparatus shown the mixed mass of the components may then, during the preparation of the feed pulp, be circulated for a period of time on a circulatory path via the mixing tank 19 and the circulation line 73, with the valves 43 and 75 opened and the valves 71 and 77 closed.

The controllable valves in the embodiment shown are all connected to the central control means 33 and may thence be operated by hand or programmed for remote control.

The apparatus is designed in such a manner that it maximally may supply a throughput of a feed pulp necessary when the pens are completely occupied by grown up animals. In this arrangement, because of the then relatively great consumption of feed pulp, the dwelling time of the feed pulp in the pipeline is so short that a disturbing decomposition of the feed pulp cannot occur. If, however, the apparatus is to be operated with strongly reduced medium feed requirement, especially when feeding young animals, the dwelling time of the feed pulp in the pipeline 17 might become so long with the usual manner of operation using a continuous feed pulp strand, that the feed pulp perishes and the animals may be dangerously affected. Therefore, a feed pulp strand 79 of limited length only is introduced into the pipeline 17 from the preparation station, and subsequently a filling fluid which is unobjectionable from a nourishing physiological viewpoint, preferably water, is forced into the pipeline 17, so that the feed pulp strand 79 is propelled by the filling liquid. The feed pulp strand 79 which contains only a relatively small amount of feed, may be quickly propelled to the desired dispensing stations and may be fed there so quickly that no long dwelling times of the feed pulp are occurring in the pipeline. The feed thus can no longer perish.

The formation of the feed pulp strand 79 and the filling liquid column adjoining it may take place, for instance, in that the amount of feed pulp necessary for the formation of the feed pulp strand 79 only is prepared in the mixing tank 19 and after discharging the mixing tank 19 into the pipeline 17 water is refilled and pumped into the pipeline 17.

In the following, the operation of the apparatus will be explained assuming that only the pens 3 and 7 are indeed occupied with young animals, so that the feed requirement only is a fraction of the value given with the plant completely occupied by grown up animals, for which it is designed. The total volume of the pipeline 17 may, for example, amount to about 700 liters between the valves 77 and 55-7. If, in the example assumed in this arrangement the young animals in the pens 3 and 7 only need 150 liters of feed pulp each, thus, altogether 300 liters of feed pulp per feeding operation, with the preknown mode of operation in which the whole pipeline 17 is filled with feed pulp, too great a dwelling time would result for the feed pulp.

In the FIGURE of the drawing the feed pulp strand 79 is represented in different phases A, B, C, D, E, F, G.

Although not necessary the pipeline 17 is suitably first filled with water in some way. This may be performed in particular by first filling the empty mixing tank 19 with water from the supply container 25 and then pumping the water through the pipeline 17 with the aid of the conveying device 45 with the valves 77, 55-1, 55-3, 55-5, 55-7 and 71 open, until the entire pipeline is filled with water and the mixing tank 19 is again empty. Thereupon, predetermined amounts of the feed components are filled into the mixing tank 19 from the supplies 21, 23, 25 with the valve 43 closed, the agitator 39 is switched on for a predetermined period of time (a repumping may also still take place in this connection, if desired, via the circulation line 73), thereupon the amount of readily produced feed pulp 41, which is sufficient for one feeding operation, is forced into the pipeline 17 by the conveying means 45, with the valves 43 and 77 open and the circulation valve 75 closed. As soon as the mixing tank 19 is empty, water is refilled from the supply 25, so that the conveying means 45 then forces water into the pipeline 17 instead of feed pulp. The result thus is a feed pulp strand 79 of limited length which, for instance, passes through the intermediate whereabouts or position A, as shown. As soon as the volume of feed pulp and water forced as a whole into the pipeline 17 has obtained a value at which the feed pulp strand 79 has reached position B, namely in pen 3, in which animals are to be fed, the pipeline 17 is closed downstream of pen 3, in the simplest manner by closing the appertaining group end valve 55-3, and the discharge valves 61-3 of pen 3 are opened. The conveyance through the conveying means 45 is continued, until a predetermined further volume has been conveyed which is equivalent to the volume of feed required for pen 3. Condition C will then be obtained. Because of the amount of feed taken from the feed pulp strand 79 the length of the feed pulp strand (now 81) still available has become correspondingly shorter. Thereupon, the flow through the pipeline 17 downstream from pen 3 is again released, here, through opening the group end valve 55-3, the discharge valves 61-3 of the pen are closed and the conveyance is continued, until the strand 81 via intermediate positions such as D, for example, assumes position E necessary for feeding pen 7, i.e. before the dispensing stations 59-7 of pen 7. Thereupon, pipeline 17 is closed downstream, namely by closing the group end valve 55-7 and, upon continued conveyance, the discharge valves 61-7 of pen 7 are opened one after the other for predetermined time intervals in the sense of the FIGURE from right to left. By the amounts of feed thereby taken from the shorter feed pulp strand 81 said feed pulp strand 81 is progressively shortened, namely via the phases F and G, until finally the last remainder of the feed pulp has been dispensed into pen 7 via the discharge valve shown at the extreme left in the FIGURE. Thereafter, the apparatus is again in its condition of being completely filled with water as at the beginning.

It goes without saying that with the operational steps as described the feed pulp strand 79 will in part mix at the ends thereof with the filling liquid (the water) and that the control of the feed pulp strand 79 in certain positions within the pipeline 17 is subject to a certain inaccuracy. But is has been found that deviations from the ideal runoff occurring in this manner in practice are meaningless. This is particularly applicable if, after the feeding operation has been completed, the pipeline 17 is additionally flushed with water.

It is easily recognizable that all the operational steps as described may be brought to run off automatically according to a predetermined program, especially under the control and guidance by the control mans 33, and that a conversion to meet other requirements may easily be obtained by changing the program.

I claim:

1. A method of automatically feeding animals, especially pigs, in which a predetermined stream of a pumpable feed pulp is conveyed via a pipeline from a preparation zone to a feeding zone remote therefrom, the cross-sectional area of said pipeline being dimensioned corresponding to a power demand for the conveying in view of the consistency of the feed pulp and the feed requirement to be met when the feeding zone is occupied by grown up animals, with the feeding times and amounts of feed being preferably predetermined automatically, characterized in that for feeding with the feed requirement reduced or the feed composition changed, especially when feeding young animals which are perhaps present only in selected portions of the feeding zone, a feed pulp strand of limited length is conveyed through the pipeline to at least one dispensing station in the feeding zone by means of a filling liquid introduced into the pipeline, which is unobjectionable from a nourishing physiological viewpoint, and in that the length of the strand is dimensioned to be such that said strand is fed within a time interval sufficiently short to keep it fresh.

2. A method according to claim 1, wherein the feed pulp is dispensed in the feeding zone via a series of dispensing stations distributed along the pipeline and fed from the pipeline, said dispensing stations being adapted to be selectively opened towards the pipeline in groups of at least one dispensing station each, characterized in that selected groups of dispensing stations are supplied one after the other with selected amounts of feed pulp from one and the same feed pulp strand, with the respective other groups being shut off from the pipeline.

3. A method according to claim 1 wherein the feed pulp is dispensed in the feeding zone via a series of dispensing stations distributed along along the pipeline and fed from the pipeline, said dispensing stations being adapted to be selectively opened towards the pipeline in groups of at least one dispensing station each, and characterized in that the position of the feed pulp strand in the pipeline is detected from the volume of feed pulp and filling liquid introduced into the pipeline, and only those dispensing stations only of the selected groups are opened towards the pipeline which are disposed within the zone in which the feed pulp strand is positioned.

4. A method according to claim 3, characterized in that guiding valves are actuated to determine the path of transport of the feed pulp strand in dependence upon the detected position of the feed pulp strand.

5. A method according to claim 1, characterized in that several feed pulp strands are introduced one after another into the pipeline at predetermined times, with the filling liquid introduced in between, according to a feeding program.

6. A method according to claim 5, characterized in that feed pulp strands of different compositions are used and guided to selected dispensing stations.

7. A method according to claim 1, characterized in that the filling liquid and possible surplus proportions of the feed pulp strand are discharged from the feeding zone via a selectively openable discharge line.

8. A method according to claim 1, characterized in that water is used as the filling liquid.

9. An apparatus for automatically feeding animals comprising preparation means (19, 21, 23, 25) for preparing a pumpable feed pulp (41) from several components, a pipeline (17) for establishing a connection between the preparation means and a feeding zone (9) comprising at least one group of dispensing stations having controllable discharge valves (61), a conveying means (45) for conveying pumpable media present in the pipeline, means (53) for determining the flow in the pipeline (17), and control means (33) for controlling the apparatus, with the free cross sectional area of the pipeline (17) being selected corresponding to the viscosity of the feed pulp so that a flow of feed pulp sufficient to feed grown up animals may be established at a reasonable expenditure in terms of energy for the conveying means, and with the pipeline beyond the dispensing stations preferably being connected to an outlet line (69) via a controllable outlet valve (55-7), characterized in that means are provided for the selective metered introduction of a nourishing-physiologically unobjectionable filling liquid, preferably water, into the pipeline (17) instead of feed pulp, and in that the control means (33) comprises means for detecting the position of a feed pulp strand (79, 81) of limited length charged into the pipeline (17) and adapted to be propelled by means of a filling liquid and is designed to control the discharge valves in dependence upon the detected position of the feed pulp strand.

10. An apparatus according to claim 9, characterized in that each group of dispensing stations is connected to the pipeline (17) in locations distributed along the length of the pipeline.

11. An apparatus according to claim 9, characterized in that the dispensing stations belonging to one and the same group are connected to the pipeline (17) at locations distributed along the length of the pipeline.

12. An apparatus according to claim 9 characterized by the preparation means being arranged for selectively producing feed pulp strands of different compositions.

* * * * *

UNITED STATES PATENT AND TRADEMARK OFFICE
CERTIFICATE OF CORRECTION

PATENT NO.  : 4,541,361
DATED       : September 17, 1985
INVENTOR(S) : Walter Holter It is certified that error appears in the above-identified patent and that said Letters Patent is hereby corrected as shown below:

In Claim 3, line 41, the words "along along" should read --along--.

Signed and Sealed this

Third Day of June 1986

[SEAL]

Attest:

DONALD J. QUIGG

*Attesting Officer*   *Commissioner of Patents and Trademarks*